United States Patent
Huang et al.

(10) Patent No.: US 8,601,125 B2
(45) Date of Patent: Dec. 3, 2013

(54) SERVICE PROCESSING METHOD AND SYSTEM, AND POLICY CONTROL AND CHARGING RULES FUNCTION

(75) Inventors: Shibi Huang, Shenzhen (CN); Peng Zhao, Shenzhen (CN); Yuxin Mao, Shenzhen (CN); Shiyong Tan, Shenzhen (CN); Yan Li, Shenzhen (CN); Weihua Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 305 days.

(21) Appl. No.: 12/564,558

(22) Filed: Sep. 22, 2009

(65) Prior Publication Data

US 2010/0017846 A1 Jan. 21, 2010

Related U.S. Application Data

(63) Continuation of application No. PCT/CN2007/003984, filed on Dec. 29, 2007.

(30) Foreign Application Priority Data

Mar. 23, 2007 (CN) .......................... 2007 1 0089952

(51) Int. Cl.
*G06F 15/173* (2006.01)
(52) U.S. Cl.
USPC ............ 709/225; 709/223; 709/224; 709/226
(58) Field of Classification Search
USPC .................................. 709/223, 224, 225, 226
See application file for complete search history.

(56) References Cited

U.S. PATENT DOCUMENTS

2005/0190765 A1 9/2005 Gotoh et al.
2006/0135172 A1 6/2006 Dronne et al.
2007/0189185 A1 8/2007 Chen et al.
2008/0046963 A1* 2/2008 Grayson et al. .................. 726/1
2009/0181685 A1* 7/2009 Ekstrom et al. ............... 455/450

FOREIGN PATENT DOCUMENTS

| EP | 1 610 502 A1 | 12/2005 |
|---|---|---|
| JP | 2005051580 A | 2/2005 |
| JP | 2005244904 A | 9/2005 |

(Continued)

OTHER PUBLICATIONS

Index of /ftp/Specs/archive/29_series/29.213.*

(Continued)

*Primary Examiner* — Rupal Dharia
*Assistant Examiner* — Van Kim T Nguyen
(74) *Attorney, Agent, or Firm* — Brinks Gilson & Lione

(57) ABSTRACT

A service processing method, a service processing system, and a PCRF entity are disclosed to overcome this defect in the prior art: The prior art is unable to handle services discriminatively according to the policy context information when different services require the same QoS level. The method includes: receiving bearer priority information from a PCRF entity, where the bearer priority information includes: bearer priority information of a service data stream, bearer priority information of an IP-CAN session, and/or bearer priority information of an IP-CAN bearer; and handling services according to the bearer priority information. In the embodiments of the present invention, the policy context information is converted into bearer priority information so that the PCEF handles services according to the bearer priority information. In this way, different services that require the same QoS level are handled discriminatively according to the policy context information.

16 Claims, 10 Drawing Sheets

(56) References Cited

FOREIGN PATENT DOCUMENTS

| JP | 2006514510 A | 4/2006 |
|---|---|---|
| WO | WO 2004/036825 A1 | 4/2004 |
| WO | 2005/084061 A1 | 9/2005 |
| WO | WO 2005081559 A | 9/2005 |
| WO | WO 2006/071155 A1 | 7/2006 |

OTHER PUBLICATIONS

Written Opinion of the International Searching Authority issued in corresponding PCT Patent Application No. PCT/CN2007/003984, mailed Apr. 10, 2008.

Extended European Search Report issued in corresponding European Patent Application No. 07846018.5, mailed Sep. 30, 2010.

3$^{rd}$ General Partnership Project: Technical Specification Group Services and System Aspects; Policy and Charging Control Architecture (Release 7), 3GPP TS 23.203, V7.1.0, Dec. 2006.

3$^{rd}$ General Partnership Project: Technical Specification Group Core Network and Terminals; Policy and Charging Control Signalling Flows and QoS Parameter Mapping (Release 7), 3GPP TS 29.213, V7.0.0, Mar. 2007.

3$^{rd}$ General Partnership Project: Technical Specification Group Core Network and Terminals; Policy and Charging Control over Gx Reference Point (Release 7), 3GPP TS 29.212, V7.0.0, Mar. 2007.

3$^{rd}$ General Partnership Project: Technical Specification Group Services and System Aspects; General Packet Radio Service (GPRS); Service Description; Stage 2 (Release 7), 3GPP YS 23.060, V7.3.0, Dec. 2006.

3$^{rd}$ General Partnership Project: Technical Specification Group Services and System Aspects; Quality of Service (QoS) concept and architecture (Release 6), 3GPP TS 23.107, V6.4.0, Mar. 2006.

3$^{rd}$ General Partnership Project: Technical Specification Group Services and System Aspects; 3GPP System Architecture Evolution: GPRS enhancements for LTE access; Release 8, 3GPP TS 23.401, V0.2.0, Feb. 2007.

3$^{rd}$ General Partnership Project: Technical Specification Group Core Network and Terminals; Mobile radio interface Layer 3 specification; Core Network Protocols; Stage 3 (Release 7), 3GPP TS 24.008, V7.6.0, Dec. 2006.

3$^{rd}$ General Partnership Project: Technical Specification Group Core Network and Terminals; General Packet Radio Service (GPRS); GPRS Tunnelling Protocol (GTP) across the Gn and Gp interface (Release 7), 3GPP TS 29.060, V7.4.0, Dec. 2006.

3$^{rd}$ General Partnership Project: Technical Specification Group Core Network and Terminals; Policy and Charging Control over Gx reference point (Release 7), 3GPP TS 29.212, V1.1.0, Feb. 2007.

3$^{rd}$ General Partnership Project: Technical Specification Group Core Network and Terminals; Policy and charging control signalling flows and Qos parameter mapping (Release 7), 3GPP TS 29.213, V1.1.0, Feb. 2007.

3$^{rd}$ General Partnership Project: Technical Specification Group Core Network and Terminals; Policy and charging control over RX reference point (Release 7), 3GPP TS 29.214, V1.1.0, Feb. 2007.

3$^{rd}$ General Partnership Project: Technical Specification Group Core Network and Terminals; CT WG3 aspect of 3GPP System Architecture Evolution (Stage 3) Release 8, 3GPP TR 29.804. V01.1.0, Feb. 2007.

Telecommunications and Internet Converged Services and Protocols for Advanced Networking (TISPAN): Resource and Admission Control: DIAMETER protocol for session based policy set-up information exchange between the Application Function (AF) and the Service Policy Decision Function (SPDF); Protocol specification. ETSI TS 183 017, V1.1.1, Mar. 2006.

Office Action issued in corresponding Japanese Patent Application No. 2009-546630, mailed Mar. 27, 2012.

\* cited by examiner

SERVICE PROCESSING METHOD AND SYSTEM, AND POLICY CONTROL AND CHARGING RULES FUNCTION

CROSS-REFERENCE TO RELATED APPLICATION

This application is a continuation of International Application No. PCT/CN2007/003984, filed on Dec. 29, 2007, which claims the priority of Chinese Patent Applications No. 200710089952.5, filed on Mar. 23, 2007. The contents of the above identified applications are incorporated herein by reference in their entireties.

FIELD OF THE INVENTION

The present invention relates to communication technologies, and in particular, to a service processing method and system, and a Policy Control and Charging Rules Function (PCRF) entity.

BACKGROUND

As shown in FIG. 1, the existing service processing system includes: a PCRF entity, adapted to decide Policy and Charging Control (PCC) rules according to the network access restrictions imposed on a user, service provider policies, and subscription data obtained from a Subscription Profile Repository (SPR), and user's underway service information obtained from an Application Function (AF) entity, and provide the PCC rules for a Policy and Charging Enforcement Function (PCEF) entity, whereupon the PCEF entity executes the PCC rules that include a service data stream detection rule, an access control rule, Quality of Service (QoS) corresponding to the service data stream, and a stream-based charging rule; a PCEF entity, set in a gateway and adapted to detect the service data stream according to the PCC rules delivered by the PCRF entity, execute the policies (including QoS policies) to ensure the QoS of the service data stream, and perform stream-based charging; a SPR, adapted to store subscription data; and an AF entity, adapted to provide service-layer service information for the PCRF dynamically so that the PCRF generates or modifies the corresponding rules dynamically according to the information.

Based on the foregoing communication system, the process of setting up an Internet Protocol Connectivity Access Network (IP-CAN) session and the process of setting up an IP-CAN bearer are described below by reference to FIG. 2 and FIG. 3.

As shown in FIG. 2, the process of setting up an IP-CAN session includes the following steps:

Step 201: After receiving an IP-CAN session setup request from a user terminal, the PCEF allocates an IP address visible to a Public Data Network (PDN), and sets up the first PDP context.

Step 202: The PCEF creates a new Diameter Credit-Control (DCC) session, and sends a Credit-Control-Request (CCR) message which notifies the PCRF to set up an IP-CAN session. The CCR message carries a user terminal identifier and an IP address.

Step 203: The PCRF stores the user terminal identifier and the IP address carried in the CCR message.

Step 204: The PCRF sends a subscription profile request to the SPR when requiring the subscription-related information.

Step 205: The SPR returns a subscription response which carries the information such as the service currently subscribed to by the user, and the charging mode.

Step 206: The PCRF generates a new PCC rule.

Step 207: The PCRF stores the PCC rule.

Step 208: Through a Credit Control Answer (CCA) message, the PCRF returns the PCC rule to the PCEF.

Step 209: The PCEF loads the rule, and connects or disconnects the corresponding service data stream according to the rule in order to ensure the corresponding QoS.

Step 210: The PCEF returns an IP-CAN session setup response to the user terminal.

As shown in FIG. 3, the process of setting up an IP-CAN bearer includes the following steps:

Step 301: After receiving a trigger event (for example, a multimedia call control signaling initiated by the user terminal to start an AF session), the AF entity needs to set up a new Diameter session and provide service information for the PCRF.

Step 302: The AF entity extracts the desired service information (for example, IP stream address information, port ID, and media type) from the trigger event.

Step 303: The AF sends to the PCRF a Diameter Authentication Authorization Request (AAR) message which carries service information.

Step 304: The PCRF stores the received service information.

Step 305: If the PCRF has no subscription profile of the user at this time, the PCRF sends a subscription request to the SPR to obtain the subscription profile of the user.

Step 306: The SPR responds to the PCRF with a subscription response which carries information about the service currently subscribed to by the user.

Step 307: According to the received service information and the information from the PCEF (for example, IP address of the IP-CAN session), the PCRF correlates the AF session with a corresponding IP-CAN session.

Step 308: The PCRF returns an Authentication Authorization Answer (AAA) message to the AF entity. The AF entity sends the AAA message to the user terminal. After receiving the AAA message, the user terminal sends an IP-CAN session message to the PCEF.

Step 309: After receiving the IP-CAN session message from the user terminal, the PCEF requires setup of a new IP-CAN bearer, and sets up the second PDP context.

Step 310: The PCEF sends to the PCRF a CCR message which notifies the PCRF to modify the IP-CAN session and requests for the PCC rule for the IP-CAN bearer.

Step 311: The PCRF stores the IP-CAN bearer information carried in the CCR message.

Step 312: The PCRF uses the information received from the PCEF and the service information to correlate the IP-CAN session with a specific AF session (one IP-CAN session may be correlated with multiple AF sessions).

Step 313: The PCRF generates a new PCC rule according to the information such as service information, subscription profile of the user, and service provider configuration.

Step 314: The PCRF stores the new PCC rule.

Step 315: The PCRF responds to the PCEF with a CCA message which carries the new PCC rule.

Step 316: The PCEF loads the rule, and connects or disconnects the corresponding service data stream according to the rule in order to ensure the corresponding QoS.

Step 317: The PCEF returns an IP-CAN session response to the user terminal, thus finishing the setup of the IP-CAN bearer.

Through the foregoing IP-CAN session setup process and IP-CAN bearer setup process, a binding relation between the IP-CAN session, the IP-CAN bearer and the PCC rule is generated on the PCEF entity, as shown in FIG. 4. Specifically, the user terminal succeeds in setting up an IP-CAN session once an addressable IP address is allocated to the user terminal. In the process of setting up the IP-CAN bearer, the PCC rule transmitted by the PCRF through the Gx interface to the PCEF includes the QoS control parameters: bandwidth and QoS level identifier of the service data stream. In order to meet different QoS requirements, IP-CAN bearers compliant with different QoS requirements may be set up in the same IP-CAN session. For example, the service that requires a high QoS level (for example, a Voice over Internet Protocol (VoIP) service, and a multimedia call) may be carried on IP-CAN bearer 1; and the service that requires a low QoS level (for example, file downloading, web page browse) may be carried on IP-CAN bearer 2. Each IP-CAN bearer may bear multiple IP streams (for example, the user may download files on different servers simultaneously). The PCEF may identify the IP stream according to the PCC rule (the PCC rule includes an IP quintuplet, namely, IP source address, IP destination address, IP source port ID, IP destination port ID, and protocol), and may put IP streams into different IP-CAN bearers according to the QoS required by the PCC rule. Each PCC rule may correspond to one or more IP streams (also called service data streams).

In the mechanism provided by the existing PCC, the PCRF decides the QoS parameters such as QoS level identifier and bandwidth of the service data stream according to the policy context information (for example, priority of the application service, priority subscribed to by the user, custom-defined QoS policy configured by the service provider), and then transmits the IP quintuplet filter rule of the service data stream and the corresponding QoS parameter to the PCEF through the Gx interface. The PCEF exercises QoS control for the service data stream according to the QoS parameter of the service data stream, and ensures the corresponding QoS levels for the service data streams that require different QoS levels.

In some scenarios, when service data streams require the same QoS level, the bearer layer needs to distinguish between the service data streams. For example, for different voice services, an ordinary voice service and an emergent voice service, their QoS requirements such as bandwidth, transmission delay and packet loss ratio are the same, but the emergent voice service is expected to be fulfilled first when the two services contend for the same bearer transmission resource. In an example, if different users require the same QoS level, the different users need to be distinguished according to the subscribed user type, and the user of higher priority (such as gold user) is expected to be satisfied first when different users contend for the same bearer transmission resource. In the existing PCC mechanism, the PCRF can only export the bearer-layer QoS level identifier and transmit it to the PCEF for undergoing QoS control. It is not possible for the PCEF to handle the bearers requiring the same QoS level discriminatively according to different conditions.

In the prior art, a concept of Allocation/Retention Priority (ARP) is put forward. The allocation priority is used for allocating resources according to the priority when the user sets up a Radio Access Bearer (RAB), and the retention priority is used for a Universal Terrestrial Radio Access Network (UTRAN) to retain resources according to the priority after the service is set up. However, the ARP does not reflect priority of a specific service, and a possible sequence is: The service of higher priority has a low ARP level, and therefore, the corresponding user session is released. That makes it impossible to reserve resources of the access network based on service priority, and makes it impossible to support the service priority throughout the network.

To sum up, the prior art does not allow for the factor of the policy context and cannot handle services discriminatively according to the policy context when different services require the same QoS level.

SUMMARY

A service processing method, a service processing system, and a PCRF entity are disclosed in an embodiment of the present invention to handle services discriminatively according to the policy context information when different services require the same QoS level.

A service processing method is disclosed in an embodiment of the present invention. The method includes:

receiving bearer priority information from a PCRF entity, where the bearer priority information includes: bearer priority information of a service data stream, bearer priority information of an IP-CAN session, and/or bearer priority information of an IP-CAN bearer; and handling services according to the bearer priority information.

A service processing system is disclosed in an embodiment of the present invention. The system includes:

a PCRF entity, adapted to: obtain policy context information which includes at least one of these factors: service type, service priority, user priority, and custom-defined priority; generate bearer priority information according to the policy context information, and send the bearer priority information to a PCEF entity; and a PCEF entity, adapted to handle services according to the bearer priority information.

A PCRF entity is disclosed in an embodiment of the present invention. The PCRF entity includes:

an obtaining unit, adapted to obtain policy context information which includes at least one of these factors: service type, service priority, user priority, and custom-defined priority;

a generating unit, adapted to generate bearer priority information according to the policy context information; and a sending unit, adapted to send the bearer priority information to the PCEF entity.

A PCEF entity is disclosed in an embodiment of the present invention. The PCEF entity includes:

a receiving unit, adapted to receive the bearer priority information from the PCRF entity for handling services; and a processing unit, adapted to handle the services according to the bearer priority information.

In the embodiments of the present invention, the policy context information is converted to bearer priority information so that the PCEF handles services according to the bearer priority information. In this way, different services that require the same QoS level are handled discriminatively according to the policy context information.

DETAILED DESCRIPTION

In order to help those skilled in the art understand and implement the present invention, the embodiments of the present invention are illustrated below with accompanying drawings.

Embodiment 1

Figure 5:
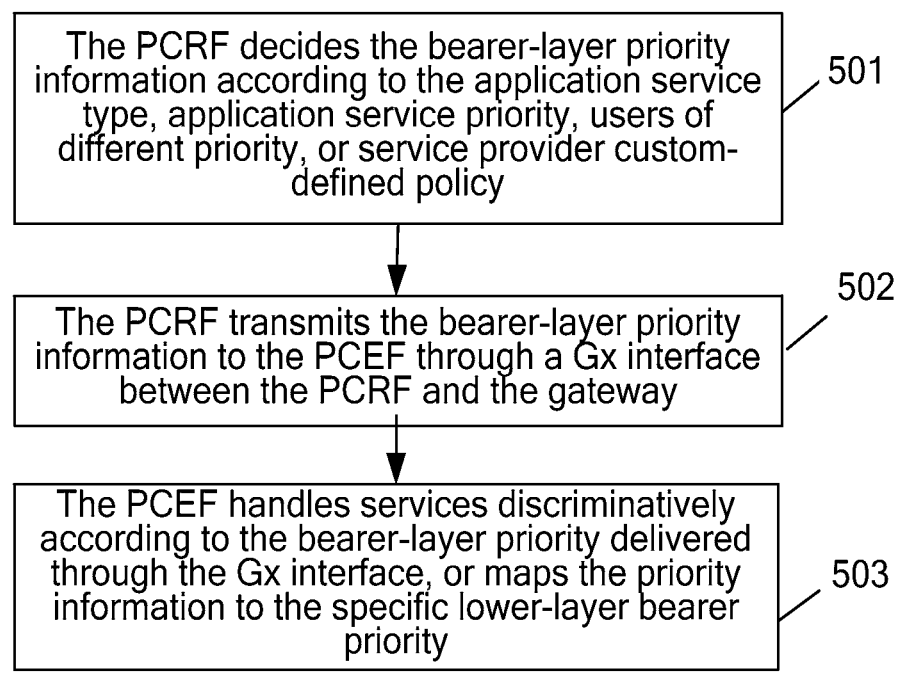
FIG. 5 shows a service processing flow in the first embodiment of the present invention.

As shown in FIG. 5, a service processing method is disclosed in this embodiment. The method includes the following steps:

Step 501: The PCRF decides the bearer priority information according to policy context information such as service type, service priority, user priority and/or service provider custom-defined policy. The bearer priority information includes: priority level, and/or IP-CAN bearer ID. The bearer priority information falls into in these types: bearer priority information of a service data stream, bearer priority information of an IP-CAN session, and bearer priority information of an IP-CAN bearer.

The bearer priority level is exported according to the policy context information such as application service type, service priority, user priority, service provider policy. For example, the bearer-layer priority information may be exported only in view of the emergency service type, for instance, the bearer-layer priority level of the emergency service type is set to be the highest level. Alternatively, the bearer-layer priority information may be exported in view of the emergency service type, the voice service type and the video service type. For example, the bearer priority level of the voice emergency service is set to 15, but the bearer priority level of the video emergency service is set to 13. Alternatively, the bearer-layer priority information may be exported in view of the user priority, the voice service type and the video service type. For example, the priority level of the voice service of a gold user is 10, the bearer priority level of the voice service of a silver user is 8, and the bearer priority level of the voice service of an ordinary user is 6. Given here are only examples of exporting bearer priority levels. In practice, the specific exporting rules can be defined flexibly according to the actual requirements in the application and different policy context information on the PCRF.

Step 502: Through the Gx interface between the PCRF and the PCEF, the PCRF transmits the bearer priority information to the PCEF. The PCEF may be set in the gateway or other network elements.

In order to deliver the bearer priority information to the PCEF, a bearer priority information element "Bearer-Priority" is added in the Diameter protocol so that the bearer priority can be set in the bearer priority message (for example, a Re-Authentication Request (RAR) message, or a CCA message) directly; or the bearer priority is set in an existing information element (for example, Authorized-QoS Attribute Value Pair (AVP) information element, or Charging-Rule-Definition AVP information element), and then delivered to the PCEF through a bearer priority message. "Bearer-Priority" represents bearer priority information, and the format of "Bearer-Priority" is:

Bearer-Priority::= < AVP Header: xxxx>
[ priority ]
[ Bearer-Identifier ]

where,

"AVP Header" represents definition of the format of the bearer priority information element;

"XXXX" represents a code of the bearer priority AVP;

"priority" represents the bearer priority level, which may be an integer in a value range determined according to the bearer priority level, for example, when there are 16 bearer priority levels in total, any integer from 0 to 15 may be used as a bearer priority level, and each bearer priority level corresponds to an integer within 0-15 uniquely (for example, 0 represents the lowest priority level, and 15 represents the highest priority level); and "Bearer-Identifier" is an identifier of the IP-CAN bearer.

The bearer priority information may be set in the bearer priority information element according to the type of the bearer priority information, and then the bearer priority information element is set in different messages.

If the bearer priority information is the bearer priority information of the service data stream, the bearer identifier sub-information element is set to be null, the bearer priority level of the service data stream is set into the bearer priority level sub-information element, and the bearer priority information element is set into the Charging-Rule-Definition AVP information element, and the Charging-Rule-Definition AVP information element may be set into the CCA message and/or the RAR message. If the bearer priority information is the bearer priority information of the IP-CAN session, the bearer identifier sub-information element is set to be null, the bearer priority level of the IP-CAN session is set into the bearer priority level sub-information element, and the bearer priority information element is set into the CCA message and/or the RAR message. If the bearer priority information is the bearer priority information of the IP-CAN bearer, the IP-CAN bearer identifier is set into the bearer identifier sub-information element, the bearer priority level of the IP-CAN bearer is set into the bearer priority level sub-information element, and the bearer priority information element is set into the CCA message and/or the RAR message.

In this way, when the bearer priority information element carries no bearer identifier, if the bearer priority information element is placed in an RAR message or a CCA message, the bearer priority level denotes the priority level of the whole IP-CAN session. If the bearer priority information element is placed in the Charging-Rule-Definition AVP information element, the bearer priority level denotes the priority level of the service data stream defined in the corresponding PCC rule. If the bearer priority information element carries a bearer identifier, the bearer priority level denotes the priority level of the IP-CAN bearer identified by the bearer identifier.

The method of setting the bearer priority information element in a Diameter protocol message (such as RAR message or CCA message) is elaborated below.

(a) For the bearer priority information of the IP-CAN session, the PCRF may add a bearer priority information element into the RAR message or CCA message directly so that the bearer priority information element can be brought to the PCEF through the Diameter protocol.

A bearer priority information element may be added into an RAR message in the following way:

```
<RA-Requst> ::= < Diameter Header: 258, REQ, PXY >
        < Session-Id >
        { Auth-Application-Id }
        { Origin-Host }
        { Origin-Realm }
        { Destination-Realm }
        { Destination-Host }
        { Re-Auth-Requst-Type }
        [ Origin-State-Id ]
        *[ Event-Trigger ]
        *[ Charging-Rule-Remove ]
        *[ Charging-Rule-Install ]
        [ Charging-Information ]
        [ Authorized-QoS ]
        [ Bearer-Priority ]
        *[ Proxy-Info ]
        *[ Route-Record ]
        *[ AVP]
```

A bearer priority information element may be added into a CCA message in the following way.

```
<CC-Answer> ::= < Diameter Header: 272, PXY >
        < Session-Id >
        { Auth-Application-Id }
        { Origin-Host }
        { Origin-Realm }
        [ Result-Code ]
        [ Experimental-Result ]
        { CC-Requst-Type }
        { CC-Requst-Number }
        *[ Event-Trigger ]
        [ Origin-State-Id ]
        *[ Charging-Rule-Remove ]
        *[ Charging-Rule-Install ]
        [ Charging-Information ]
        [ Authorized-QoS ]
        [Bearer-Priority ]
        [ Error-Message ]
        [ Error-Reporting-Host ]
        *[ Failed-AVP ]
        *[ Proxy-Info ]
        *[ Route-Record ]
        *[ AVP ]
```

(b) For the bearer priority information of the service data stream, the PCRF may add a bearer priority information element into the Charging-Rule-Definition AVP information element so that the bearer priority information element can be brought to the PCEF through the Diameter protocol.

A bearer priority information element may be added into a Charging-Rule-Definition AVP information element in the following way:

```
Charging-Rule-Definition ::= < AVP Header: 1003 >
        { Charging-Rule-Name }
        [ Service-Identifier ]
        [ Rating-Group ]
        *[ Flow-Description ]
        [ Flow-Status ]
        [ Authorized-QoS ]
        [ Reporting-Level ]
        [ Online ]
        [ Offline ]
        [ Metering-Method ]
        [ Precedence ]
        [ AF-Charging-Identifier ]
```

```
        [Bearer-Priority ]
        *[ Flows ]
        *[ AVP ]
```

In this way, the PCRF can send the bearer priority information to the PCEF through a Diameter protocol message (RAR message and/or CCA message).

The method of setting the Bearer-Priority into an Authorized-QoS AVP information element is described below:

```
Authorized-QoS ::= < AVP Header: 1016 >
        [ QoS-Class-Identifier ]
        [ Maximum-Requested-Bandwidth-UL ]
        [ Maximum-Requested-Bandwidth-DL ]
        [ Guaranteed-Bitrate-UL ]
        [ Guaranteed-Bitrate-DL ]
        [Bearer-Priority]
        [ Bearer-Identifier ]
``` where "Bearer-Identifier" is an identifier of the IP-CAN bearer. If the Authorized-QoS AVP information element is placed in the Charging-Rule-Definition AVP information element, "Bearer-Priority" denotes the priority level of the service data stream defined in the corresponding PCC rule. If the Authorized-QoS AVP information element is placed in the RAR or CCA message and the Authorized-QoS AVP information element carries no bearer identifier, the "Bearer-Priority" denotes the priority level of the whole IP-CAN session. If the Authorized-QoS AVP information element is placed in the RAR or CCA message but the Authorized-QoS AVP information element carries a bearer identifier, the "Bearer-Priority" denotes the priority level of the IP-CAN bearer corresponding to the bearer identifier.

Step 503: The PCEF handles the service according to the bearer priority information delivered through the Gx interface, or maps the service to the ARP of the IP-CAN bearer so that the service can be handled according to the ARP. In this way, the PCEF can handle the service according to the policy context information, and the service priority is supported throughout the network. An example of the service handling is: The PCEF reserves resources according to the bearer priority so that when a high-priority service and a low-priority service are underway simultaneously, the high-priority service is fulfilled first.

The following embodiments 2-4 illustrate the service processing flow under the present invention in view of the mode of exporting the bearer priority level.

Embodiment 2

This embodiment gives an application instance of exporting the bearer priority information of the service data stream according to the service type of the application session.

Figure 6:
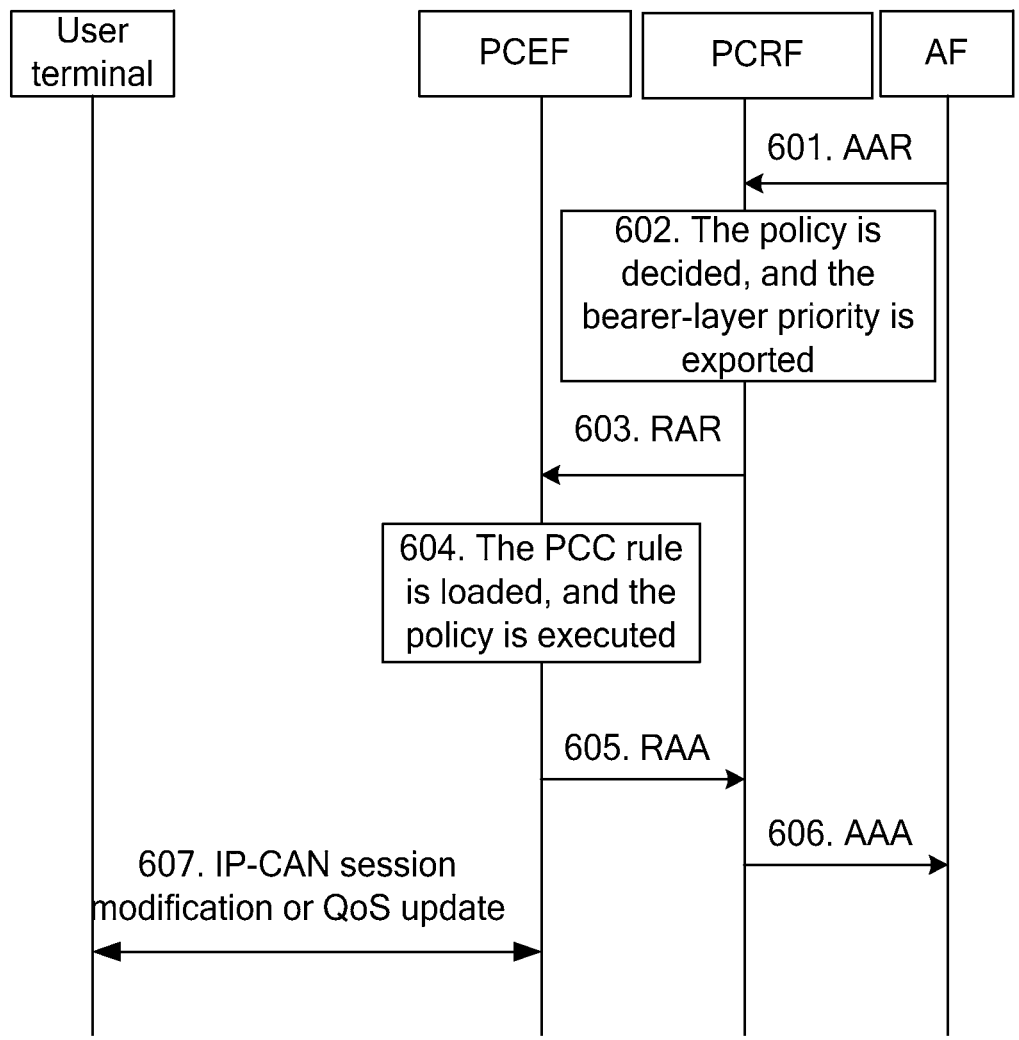
FIG. 6 shows a service processing flow in the second embodiment of the present invention.

The AF entity delivers a service type indication to the PCRF according to the service type of the application session. It is assumed that an emergency service indication is delivered to the PCRF. The PCRF exports the bearer priority level of the service data stream according to the emergency service type indication, and delivers the bearer priority level to the PCEF through a Gx interface. The PCEF changes the existing ARP priority level according to the bearer priority level of the service data stream, or creates an IP-CAN bearer compliant with the current bearer priority level for bearing the emergency service. The service processing flow in the foregoing scenario is described below by reference to FIG. 6.

Step 601: After obtaining the service type information from the application session, the AF entity sends an AAR message to the PCRF. The AAR message carries a service type and a service priority: Reservation-Priority. The Reservation-Priority (from low to high) is defined below:

DEFAULT (0)
PRIORITY-ONE (1)
PRIORITY-TWO (2)
PRIORITY-THREE (3)
PRIORITY-FOUR (4)
PRIORITY-FIVE (5)
PRIORITY-SIX (6)

Step 602: After receiving the AAR message, the PCRF exports the bearer priority information of the service data stream corresponding to the emergency service according to the service type (in this embodiment, the service type is emergency service), namely, the bearer priority level of the service data stream of the emergency service is exported. The exporting rule is described in step 501 in the first embodiment.

Step 603: The PCRF sets the bearer priority of the service data stream into the Charging-Rule-Definition AVP information element, and then sets the Charging-Rule-Definition AVP information element into the RAR message (in the way described in step 502 of the first embodiment, and sends an RAR message to the PCEF. The message carries a PCC rule that needs to be loaded, authorized QoS information, and the bearer priority level of the service data stream of the emergency service.

Step 604: The PCEF loads the PCC rule, executes the policy according to the PCC rule delivered through the Gx interface, and creates an IP-CAN bearer compliant with the current bearer priority level for bearing emergency services, or changes the existing IP-CAN bearer priority level according to the bearer priority of the service data stream. The PCEF may change the existing IP-CAN bearer priority level by mapping the bearer priority of the service data stream to the ARP priority level of the IP-CAN bearer. The mapping table is exemplified below:

| Bearer priority of service data stream | ARP priority of the IP-CAN bearer |
|---|---|
| 0, 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |

Step 605: The PCEF returns a Re-Authentication Answer (RAA) message to the PCRF.

Step 606: The PCRF returns an AAA message to the AF entity.

Step 607: The PCEF modifies the IP-CAN session or updates the QoS. Specifically, the PCEF changes the priority level of the existing IP-CAN bearer according to the ARP priority of the mapped IP-CAN bearer, or creates an IP-CAN bearer compliant with the current bearer priority level for bearing emergency services.

Ac cording to this embodiment, different service types correspond to different bearer priority levels, the emergency service corresponds to a higher bearer priority level, and the ordinary service corresponds to a lower bearer priority level. In this way, the PCEF gives precedence to the service of a higher bearer priority level when handling services, the emergency service takes precedence (for example, in bearer allocation and resource reservation), and the emergency service runs first.

Embodiment 3

Figure 7:
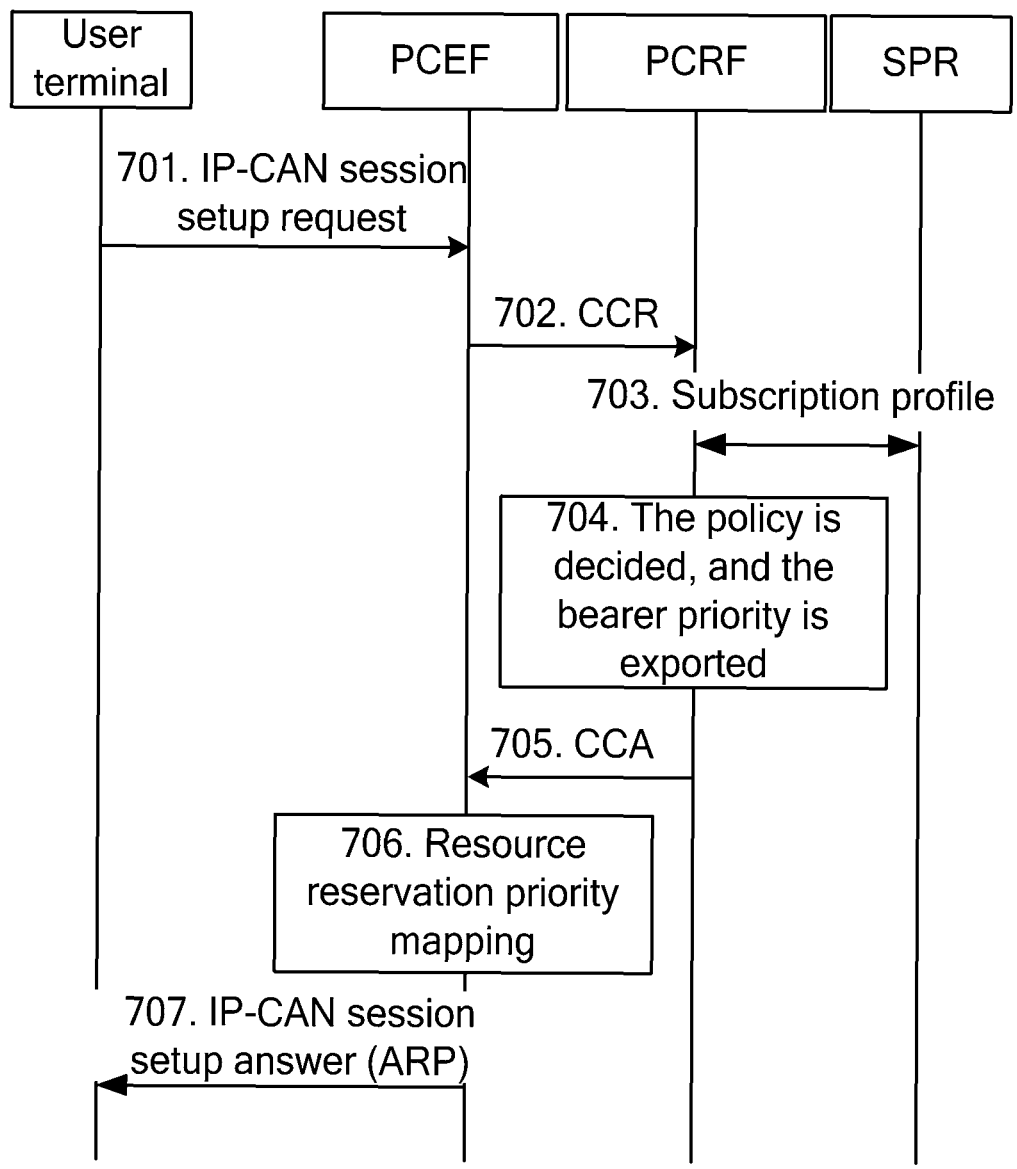
FIG. 7 shows a service processing flow in the third embodiment of the present invention.

This embodiment illustrates an application instance of exporting the bearer priority of the IP-CAN bearer according to the priority subscribed to by the user. When the user sets up an IP-CAN session, the PCRF retrieves the subscription profile from the SPR. The subscription profile defines the user priority. The PCRF exports the bearer priority according to the user priority, and sends the bearer priority to the PCEF for handling. As shown in FIG. 7, the process is detailed below:

Step 701: The user sends a request of setting up an IP-CAN session to the PCEF.

Step 702: The PCEF sends a CCR message to the PCRF to request the policy information.

Step 703: The PCRF obtains the user information from the SPR. The user information includes user priority information.

Step 704: The PCRF makes a policy decision, for example, exports the bearer priority information according to the user priority information (the exporting rule is described in step 501 of the first embodiment).

Step 705: The PCRF sends to the PCEF a CCA message which carries policy information. The policy information includes PCC rules, authorized QoS information, and the bearer priority information of the IP-CAN bearer.

Step 706: The PCEF maps the bearer priority of the IP-CAN bearer to the ARP of the IP-CAN bearer for performing resource control in the access network (the mapping method is described in step 604 of the second embodiment).

Step 707: The PCEF sends to the user terminal an IP-CAN session setup answer which carries ARP information.

According to this embodiment, different users correspond to different bearer priority levels, higher user priority corresponds to a higher bearer priority level, and lower user priority corresponds to a lower bearer priority level. In this way, the PCEF gives precedence to the service of a higher bearer priority level when handling services, the service of a higher user priority takes precedence (for example, in bearer allocation and resource reservation), and the service of higher user priority runs first.

Embodiment 4

Figure 8:
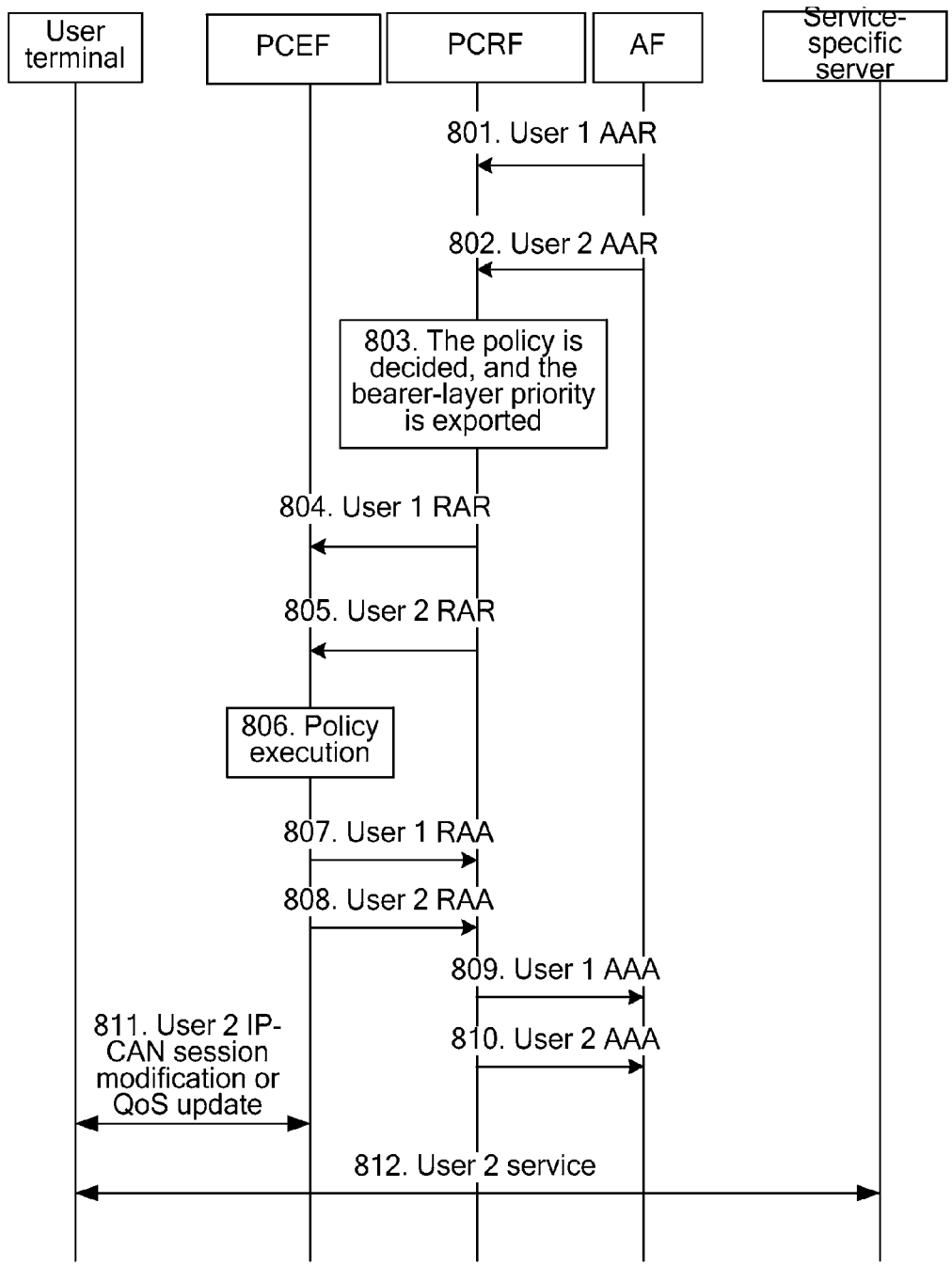
FIG. 8 shows a service processing flow in the fourth embodiment of the present invention.

This embodiment illustrates an application instance of ensuring bearer resources for higher-priority users in the case that multiple users contend for the same PCEF resource. It is assumed that the application session of user 1 and user 2 applies to the bearer-layer PCEF entity for bearer resources through the PCRF entity. As shown in FIG. 8, the process is detailed below:

FIG. 801: For user 1, the setup of the AF entity session triggers the AF entity to send an AAR message to the PCRF. The message carries service application information.

FIG. 802: For user 2, the setup of the AF entity session triggers the AF entity to send an AAR message to the PCRF. The message carries service application information.

Step 803: The PCRF makes a policy decision. According to the service application information and the subscription profile of the user, the PCRF exports the bearer priority level corresponding to the application service session of user 1 and user 2. It is assumed that the bearer priority level corresponding to the application service session of user 2 is higher than that corresponding to the application service session of user 1.

Step 804: The PCRF sends an RAR message to the PCEF. The message carries the PCC rule which needs to be loaded, modified or deleted by user 1, the authorized QoS information, and the bearer priority information.

Step 805: Likewise, the PCRF sends an RAR message to the PCEF, and the message carries the PCC rule which needs to be loaded, modified or deleted by user 2, the authorized QoS information, and the bearer priority information.

Step 806: According to the rule and the bearer priority information delivered through the Gx interface, the PCEF executes the policy. The PCEF finds that the current resource can satisfy either user 1 or user 2, but cannot satisfy both user 1 and user 2. Therefore, the PCEF allocates the bearer resource to user 2 who has a higher bearer priority level. As a result, user 2 obtains the bearer resource successfully. User 1 fails in obtaining the bearer resource for lack of resources.

Step 807: The PCEF responds to the PCRF with an RAA message which carries information about failure of allocating resources to user 1.

Step 808: The PCEF responds to the PCRF with an RAA message in response to the RAR message of user 2.

Step 809: The PCRF responds to the AF with an AAA message which carries information about failure of allocating resources to user 1. As a result, the application session on the AF entity fails.

Step 810: The PCRF responds to the AF with an AAA message in response to the AAR message of user 2.

Step 811: The PCEF initiates the operation of updating the IP-CAN session or the QoS for user 2.

Step 812: User 2 of higher priority implements the application service.

In this embodiment, due to PCEF resource limitation, the bearer resources are available to the application session of only one user. Because user 2 has higher priority, the PCEF allocates the bearer resources to user 2. Therefore, user 2 implements the application session successfully, and is free from the risk of session failure caused by resource allocation to user 1. The user session of higher priority is set up first, and the PCEF can allocate bearer resources according to the policy context information.

Embodiment 5

Figure 1:
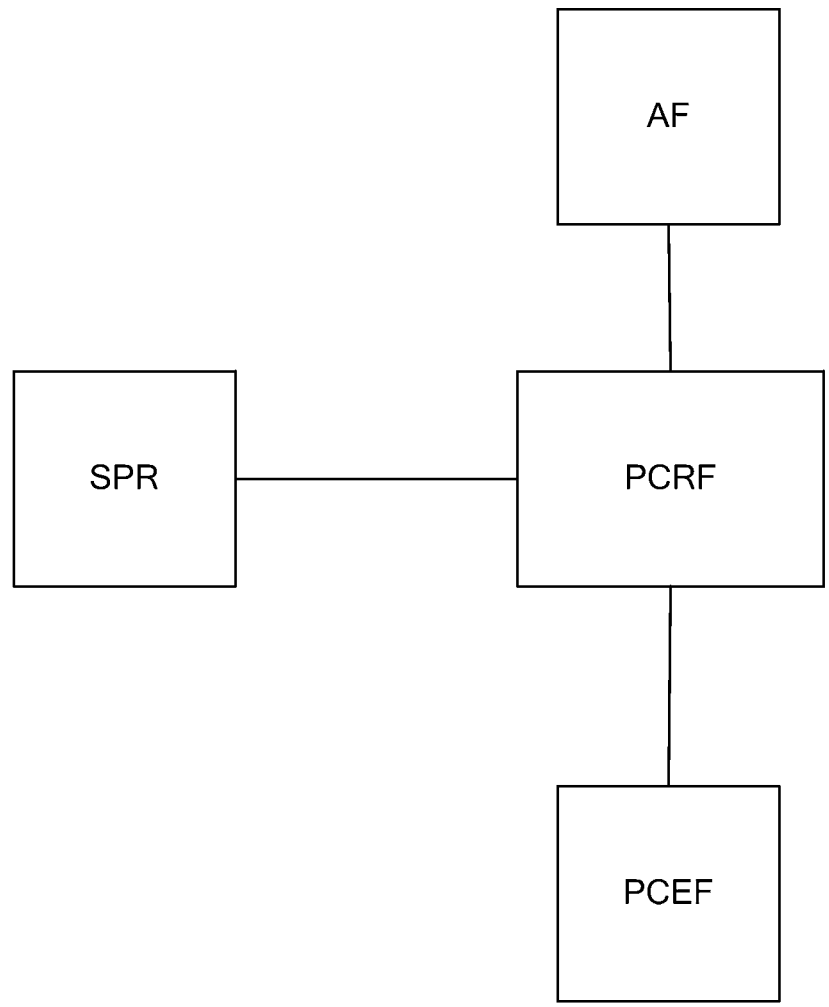
FIG. 1 shows a service processing system in the prior art.
Figure 2:
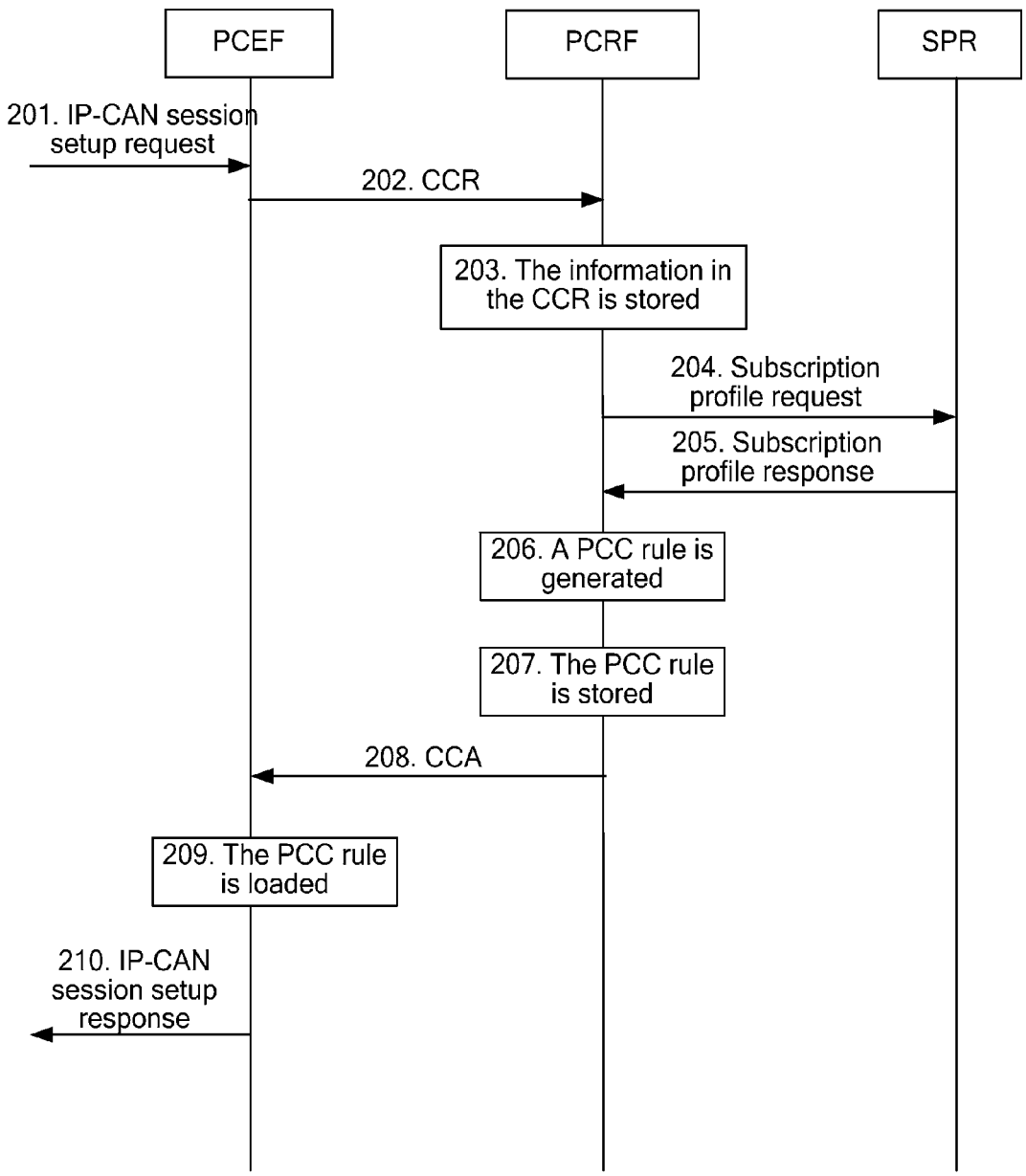
FIG. 2 shows an IP-CAN session setup process in the prior art.
Figure 3:
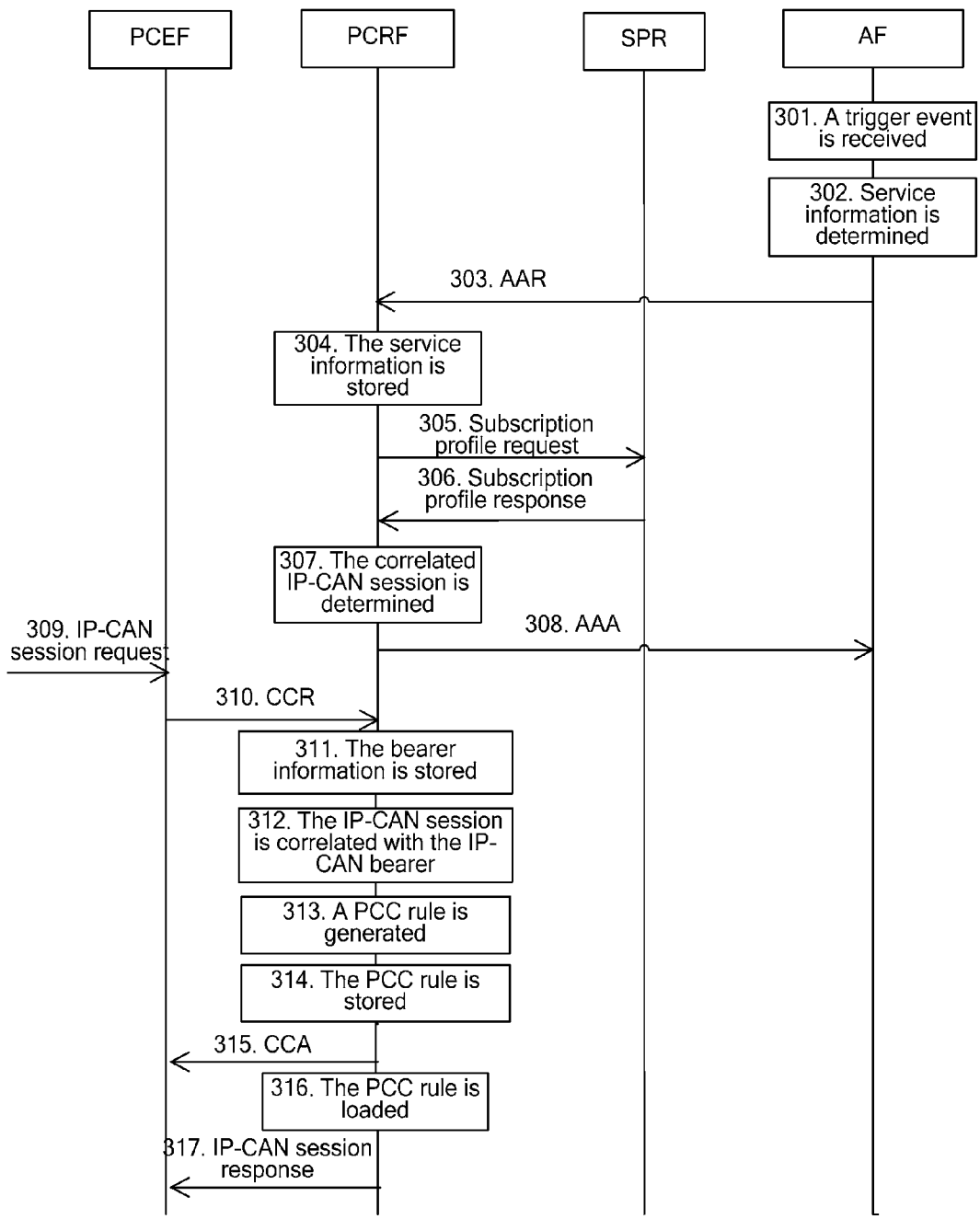
FIG. 3 shows an IP-CAN bearer setup process in the prior art.
Figure 4:
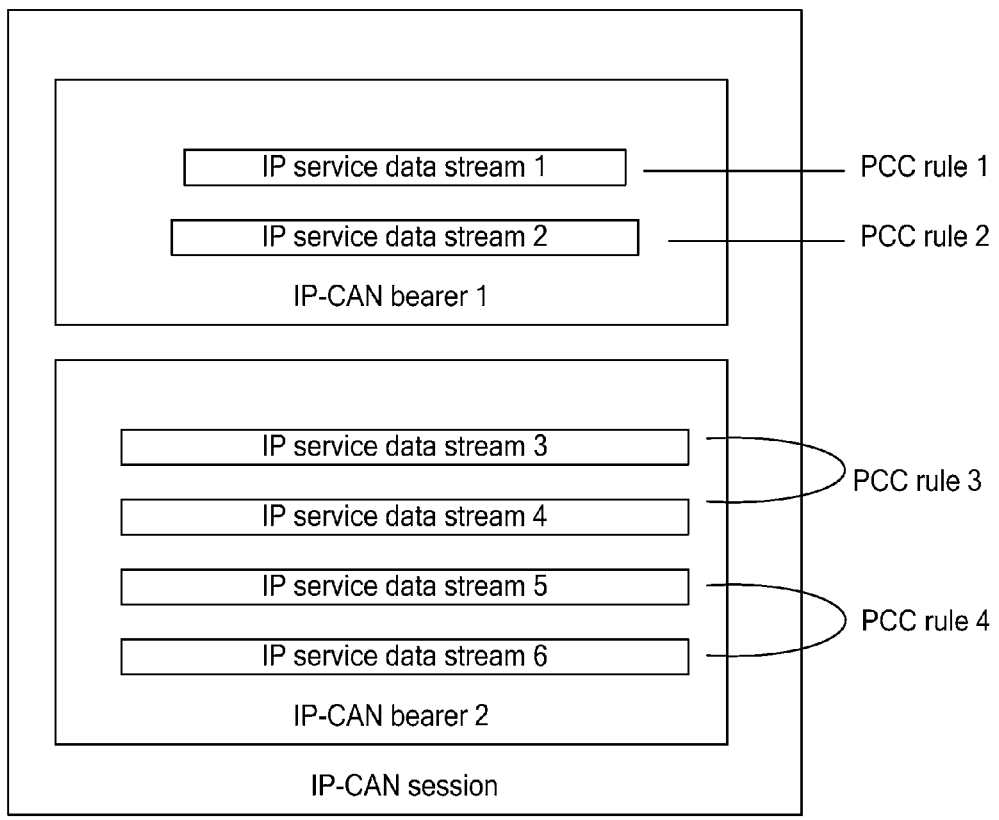
FIG. 4 shows a binding relation between an IP-CAN session, an IP-CAN bearer, a PCC rule, and an IP stream.

As shown in FIG. 1, a service processing system is disclosed in this embodiment. The system includes:
a PCRF entity, adapted to: obtain policy context information which includes at least one of these factors: service type, service priority, user priority, and custom-defined priority; generate bearer priority information according to the policy context information, and send the bearer priority information to a PCEF entity;
a PCEF entity, adapted to handle services according to the bearer priority information;
an AF entity, adapted to: obtain the service type and the service priority, and send the service type and the service priority to the PCRF entity; and
an SPR, adapted to store the user's subscription profile which includes user priority.

Embodiment 6

Figure 9:
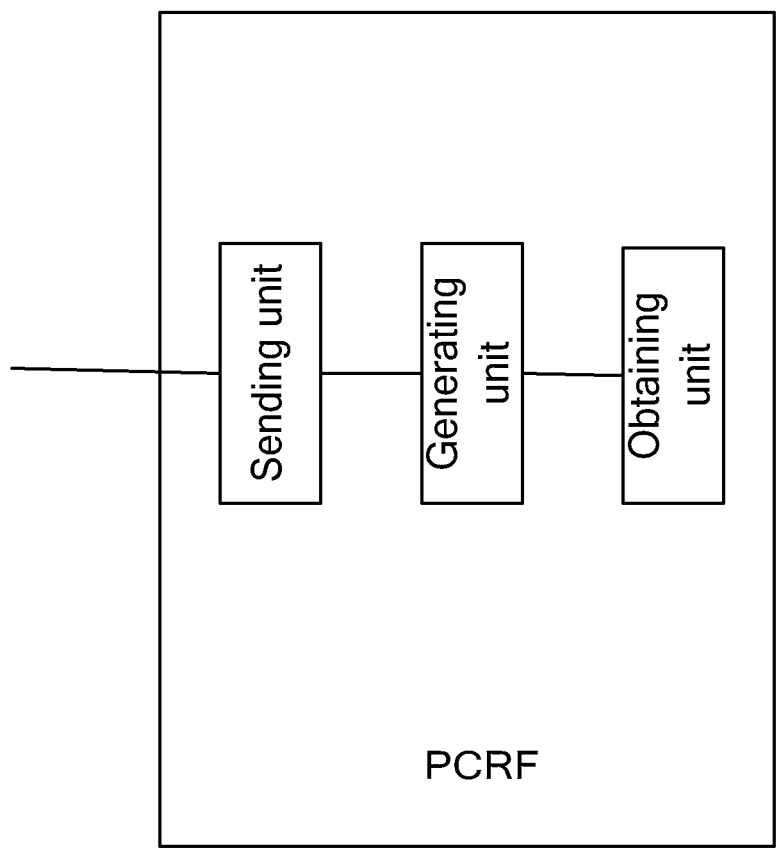
FIG. 9 shows a PCRF entity in the sixth embodiment of the present invention.

As shown in FIG. 9, a PCRF entity is disclosed in this embodiment. The PCRF entity includes:
an obtaining unit, adapted to obtain policy context information which includes at least one of these factors: service type, service priority, user priority, and custom-defined priority;
a generating unit, adapted to generate bearer priority information according to the policy context information; and
a sending unit, adapted to send the bearer priority information to the PCEF entity.

Embodiment 7

Figure 10:
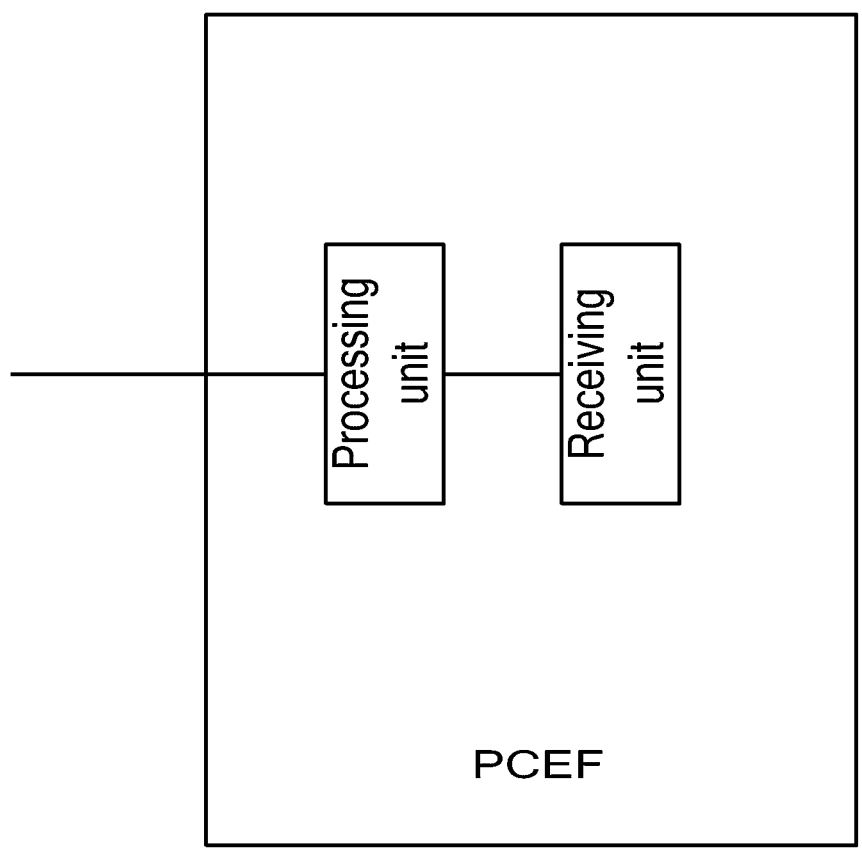
FIG. 10 shows a PCEF entity in the seventh embodiment of the present invention.

As shown in FIG. 10, a PCEF entity is disclosed in this embodiment. The PCEF entity includes:
a receiving unit, adapted to receive the bearer priority information from the PCRF entity for handling services; and
a processing unit, adapted to handle services according to the bearer priority information.

In this embodiment, the PCRF decides the bearer priority information of the bearer-layer data stream, IP-CAN session or IP-CAN bearer according to the policy context information (for example, the application service type, application service priority, users of different priority levels, and the service provider custom-defined policy). The PCRF delivers the bearer priority information to the PCEF through a Gx interface. Therefore, the PCEF handles a service data stream or a specific user bearer according to the received bearer priority information of the service data stream or the specific user bearer. Alternatively, the PCEF maps the received bearer priority information of the service data stream or the specific user bearer to ARP to correlate the service priority with the ARP used by the access network, thus facilitating the access network to handle the service data stream or the specific user bearer according to the ARP. In this way, the session of higher service priority obtains the resource first, and the session of lower service priority may be released. This can ensure that resources of the access network can be reserved based on service priority, and that the service priority is supported throughout the network.

the invention has been described through several preferred embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the claims or their equivalents.

What is claimed is:
1. A service processing method for discriminatively handling a service data stream from a plurality of service data streams, comprising:
obtaining by a Policy Control and Charging Rules Function (PCRF) entity, policy context information of a service data stream, wherein the policy context information of the service data streams comprises at least one of: service type, service priority, user priority, and custom-defined priority;

generating by the PCRF entity, bearer priority information on the service data stream according to the policy context information, wherein the bearer priority information designates a priority level of the service data stream within a bearer layer at a QoS level;

sending by the PCRF entity, the bearer priority information to a Policy and Charging Enforcement Function (PCEF) entity for discriminative handling within the bearer layer along with other service data streams which are at the same QoS level, wherein the PCEF entity performs discriminative handling function by:

processing the data stream along with the other service data streams within the bearer layer which are at the same QoS level according to the bearer priority information priority level; and adding a bearer priority information element:

wherein the bearer priority information element is set into a bearer priority message directly or set into an existing information element;

wherein a type of the bearer priority message is a Credit Control Answer (CCA) message, or a Re-Authentication Request (RAR) message; and wherein a type of the existing information element is a Charging-Rule-Definition Attribute Value Pair (AVP) information element, or an Authorized-Quality of Service (QoS) AVP information element.

2. The method of claim 1, wherein the bearer priority information element comprises: a bearer priority level sub-information element adapted to bear a bearer priority level, and a bearer identifier sub-information element adapted to bear a bearer identifier of a user.

3. The method of claim 1, further comprising: setting the bearer priority information into the bearer priority information element in the following way:

if the bearer priority information is the bearer priority information of the service data stream, setting the bearer identifier sub-information element to be null, and setting the bearer priority level of the service data stream into the bearer priority level sub-information element.

4. The method of claim 3, wherein the setting of the bearer priority information element into the bearer priority message directly comprising:

if the bearer priority information is the bearer priority information of the service data stream, setting the bearer priority information element into the Charging-Rule-Definition AVP information element.

5. The method of claim 3, wherein, when the existing information element is the Authorized QoS AVP information element, the setting of the bearer priority information element into the existing information element comprising:

if the bearer priority information is the bearer priority information of the service data stream, setting the bearer priority information element into the Authorized-QoS AVP information element, and then setting the Authorized-QoS AVP information element into the Charging-Rule-Definition AVP information element.

6. The method of claim 4, wherein the receiving of the bearer priority information from the PCRF entity comprising:

receiving the bearer priority information from the PCRF entity through the bearer priority message.

7. The method of claim 5, wherein the receiving of the bearer priority information from the PCRF entity comprising:

receiving the bearer priority information from the PCRF entity through the bearer priority message.

8. The method of claim 1, wherein the handling of the service data streams by the PCEF entity according to the bearer priority information comprising:

mapping a bearer priority level to an Allocation/Retention Priority, ARP; or handling the service data streams discriminatively according to bearer priority levels, and ensuring resources for a service of a higher bearer priority level preferentially when a resource conflict occurs.

9. The method of claim 1, wherein the obtaining, by the PCRF entity, the policy context information comprising:

obtaining, by the PCRF entity, the service type and the service priority from an Application Function (AF) entity; or obtaining, by the PCRF, the user priority from a Subscription Profile Repository (SPR).

10. A service processing system for discriminatively handling service data streams from a plurality of service data streams, the service processing system comprising:

a Policy Control and Charging Rules Function (PCRF) entity including a processor and a memory, enabled to:

obtain policy context information, which comprises at least one of: a service type, a service priority, a user priority, and a custom-defined priority;

generate bearer priority information according to the policy context information, wherein the bearer priority information designates a priority level of the service data stream within a bearer layer at a QoS level;

send the bearer priority information to a Policy and Charging Enforcement Function (PCEF) entity; wherein: the PCEF entity is enabled to handle within the bearer layer along with other service data streams which are at the same QoS level according to the bearer priority information, wherein precedence is given to a service data stream having a higher bearer priority level; and add a bearer priority information element:

wherein the bearer priority information element is set into a bearer priority message directly or set into an existing information element;

wherein a type of the bearer priority message is a Credit Control Answer (CCA) message, or a Re-Authentication Request (RAR) message; and wherein a type of the existing information element is a Charging-Rule-Definition Attribute Value Pair (AVP) information element, or an Authorized-Quality of Service (QoS) AVP information element.

11. The service processing system of claim 10, further comprises:

an Application Function, AF, entity, enabled to obtain the service type and the service priority, and send the service type and the service priority to the PCRF entity.

12. The service processing system of claim 10, further comprises:

a Subscription Profile Repository (SPR) enabled to store a user's subscription profile comprising the user priority.

13. A Policy Control and Charging Rules Function (PCRF) entity including a processor and a memory, comprising:

an obtaining unit, enabled to obtain policy context information, comprises at least one of: a service type, a service priority, a user priority, and a custom-defined priority;

a generating unit, enabled to generate bearer priority information according to the policy context information, wherein the bearer priority information designates a priority level of the service data stream within a bearer layer at a QoS level;

a sending unit, enabled to send the bearer priority information to a Policy and Charging Enforcement Function (PCEF) entity, such that the PCEF entity discriminately processes the data stream along with other service data streams within the bearer layer which are at the same QoS level according to the bearer priority information, wherein precedence is given to a service data stream having a higher bearer priority; and an adding unit, enabled to add a bearer priority information element:

wherein the bearer priority information element is set into a bearer priority message directly or set into an existing information element;

wherein a type of the bearer priority message is a Credit Control Answer (CCA) message, or a Re-Authentication Request (RAR) message; and wherein a type of the existing information element is a Charging-Rule-Definition Attribute Value Pair (AVP) information element, or an Authorized-Quality of Service (QoS) AVP information element.

14. The method of claim 1, wherein the bearer priority information further comprises at least one of the followings: bearer priority information denoting the priority level of an Internet Protocol Connectivity Access Network (IP-CAN) session, and bearer priority information denoting the priority level of an IP-CAN bearer, wherein one or more IP-CAN bearers are set up in the same IP-CAN session and each of the one or more IP-CAN bearers bear one or more service data streams.

15. The method of claim 14, wherein the bearer priority information element comprises: a bearer priority level sub-information element adapted to bear a bearer priority level, and a bearer identifier sub-information element adapted to bear a bearer identifier of a user.

16. The method of claim 15, further comprising: setting the bearer priority information into the bearer priority information element in the following way:

if the bearer priority information is the bearer priority information of the IP-CAN session, setting the bearer identifier sub-information element to be null, and setting the bearer priority level of the IP-CAN session into the bearer priority level sub-information element; or if the bearer priority information is the bearer priority information of the IP-CAN bearer, setting an IP-CAN bearer identifier into the bearer identifier sub-information element, and setting the bearer priority level of the IP-CAN bearer into the bearer priority level sub-information element.

* * * * *